United States Patent
Yukitake

(10) Patent No.: US 9,623,900 B2
(45) Date of Patent: Apr. 18, 2017

(54) VEHICLE STEERING DEVICE, FAILURE DETERMINATION METHOD FOR VEHICLE STEERING DEVICE, AND CONTROL METHOD FOR STEERING MOTOR

(71) Applicant: JTEKT CORPORATION, Osaka-shi, Osaka (JP)

(72) Inventor: Yasuhiro Yukitake, Kitakatsuragi-gun (JP)

(73) Assignee: JTEKT CORPORATION, Osaka-shi (JP)

(*) Notice: Subject to any disclaimer, the term of this patent is extended or adjusted under 35 U.S.C. 154(b) by 0 days.

(21) Appl. No.: 14/626,091

(22) Filed: Feb. 19, 2015

(65) Prior Publication Data

US 2015/0239492 A1    Aug. 27, 2015

(30) Foreign Application Priority Data

Feb. 27, 2014 (JP) ................................. 2014-036630

(51) Int. Cl.
  *B62D 5/04*    (2006.01)
  *B62D 15/02*   (2006.01)
  *B62D 5/00*    (2006.01)

(52) U.S. Cl.
  CPC ............ *B62D 5/049* (2013.01); *B62D 5/003* (2013.01); *B62D 5/0484* (2013.01)

(58) Field of Classification Search
  CPC .......... B62D 5/04; B62D 5/00; B62D 5/0463; B62D 5/049
  USPC .......... 701/41, 42, 43, 48; 180/400, 422, 444
  See application file for complete search history.

(56) References Cited

U.S. PATENT DOCUMENTS

| | | | |
|---|---|---|---|
| 2005/0174083 A1* | 8/2005 | Sato | B62D 5/0493 318/565 |
| 2006/0169519 A1* | 8/2006 | Osonoi | B62D 1/163 180/402 |
| 2008/0078608 A1* | 4/2008 | Hara | B62D 15/0235 180/446 |

(Continued)

FOREIGN PATENT DOCUMENTS

| | | |
|---|---|---|
| EP | 2 599 687 A2 | 6/2013 |
| JP | H10-197238 A | 7/1998 |
| JP | 2013-112279 A | 6/2013 |

OTHER PUBLICATIONS

US 9,297,877, 03/2016, Kitamoto (withdrawn)*
Jun. 9, 2016 Search Report issued in European Patent Application No. 15156341.8.

*Primary Examiner* — Thomas G Black
*Assistant Examiner* — Wae Louie
(74) *Attorney, Agent, or Firm* — Oliff PLC

(57) ABSTRACT

A vehicle steering device includes: a steering mechanism that steers steered wheels by driving of a steering motor according to operation of an operation unit; a motor angle sensor that detects a rotation angle of the steering motor as an electrical angle; a steered angle sensor that detects a steered angle of the steered wheels; a storage unit in which correspondence between the electrical angle and the steered angle that are detected is stored in advance; and a failure determination unit that determines whether there is a failure or not by comparing the relation between the detected electrical angle and the detected steered angle with the correspondence between the electrical angle and the steered angle that is stored in the storage unit.

6 Claims, 11 Drawing Sheets

(56) References Cited

U.S. PATENT DOCUMENTS

| | | | | |
|---|---|---|---|---|
| 2009/0240389 A1* | 9/2009 | Nomura | ................ | B62D 5/046 |
| | | | | 701/31.4 |
| 2010/0161178 A1* | 6/2010 | Kodaira | ................ | B62D 6/003 |
| | | | | 701/41 |
| 2011/0025244 A1* | 2/2011 | Ura | ................ | B62D 5/0403 |
| | | | | 318/400.21 |
| 2012/0197493 A1* | 8/2012 | Fujimoto | ............ | B62D 15/024 |
| | | | | 701/41 |
| 2012/0312627 A1* | 12/2012 | Morishita | ........... | B62D 5/0463 |
| | | | | 180/446 |
| 2012/0330509 A1* | 12/2012 | Kornhaas | ................ | B62D 1/16 |
| | | | | 701/41 |
| 2013/0138300 A1* | 5/2013 | Hayama | ................ | B62D 6/00 |
| | | | | 701/43 |
| 2013/0245890 A1* | 9/2013 | Kageyama | ............... | B62D 7/18 |
| | | | | 701/41 |
| 2014/0008141 A1* | 1/2014 | Kageyama | ............... | B62D 5/00 |
| | | | | 180/400 |
| 2014/0191625 A1* | 7/2014 | Kitamoto | ................ | G01D 3/08 |
| | | | | 310/68 B |
| 2014/0209403 A1* | 7/2014 | Ogi | ................ | B62D 1/16 |
| | | | | 180/280 |
| 2015/0239492 A1* | 8/2015 | Yukitake | ................ | B62D 5/003 |
| | | | | 701/43 |
| 2015/0291208 A1* | 10/2015 | Miyasaka | ............... | B62D 5/003 |
| | | | | 701/41 |
| 2015/0314803 A1* | 11/2015 | Kojo | ................ | B60T 8/1755 |
| | | | | 701/43 |
| 2015/0360715 A1* | 12/2015 | Shimizu | ................ | B62D 5/001 |
| | | | | 701/43 |

\* cited by examiner

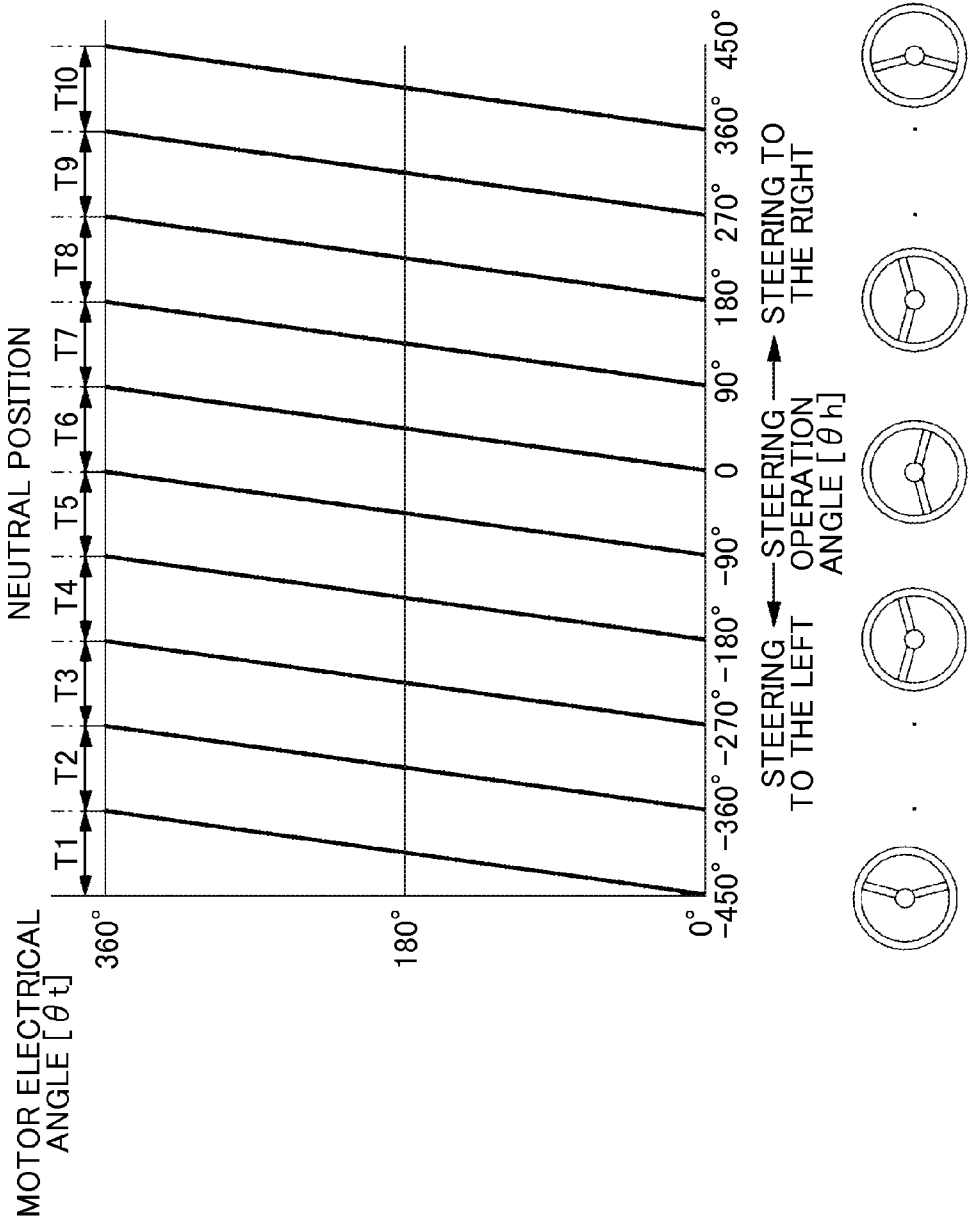

VEHICLE STEERING DEVICE, FAILURE DETERMINATION METHOD FOR VEHICLE STEERING DEVICE, AND CONTROL METHOD FOR STEERING MOTOR

INCORPORATION BY REFERENCE

The disclosure of Japanese Patent Application No. 2014-036630 filed on Feb. 27, 2014 including the specification, drawings and abstract, is incorporated herein by reference in its entirety.

BACKGROUND OF THE INVENTION

1. Field of the Invention

The invention relates to vehicle steering devices, and more particularly to vehicle steering devices capable of easily detecting a failure of a sensor etc. and capable of continuously steering a vehicle after the failure occurs, failure determination methods for the vehicle steering devices, and steering motor control methods.

2. Description of the Related Art

A device called a steer-by-wire system is proposed as an example of vehicle steering devices.

In this device, a steering operation mechanism is not mechanically coupled to a steering mechanism. This device includes a steering controller that controls a steering motor provided in the steering mechanism according to inputs from various sensors provided in the steering operation mechanism and the steering mechanism. Examples of the sensors provided in the steering operation mechanism include a steering operation angle sensor that detects a steering operation angle of a steering operation unit that is turned by a driver, and a torque sensor that detects steering operation torque applied to the steering operation unit. Examples of the sensors provided in the steering mechanism include a motor angle sensor that detects a rotation angle of the steering motor, and a steered angle sensor that detects a steered angle of steered wheels that are steered by driving of the steering motor.

See, e.g., Japanese Patent Application Publication Nos. H10-197238 (JP H10-197238 A) and 2013-112279 (JP 2013-112279 A).

The steer-by-wire system does not use mechanical coupling between the steering operation mechanism and the steering mechanism to steer a vehicle. Instead, the steer-by-wire system drivingly controls the steering motor by the steering controller according to the inputs from the various sensors, thereby steering a vehicle according to the turning operation of the steering operation unit. It is therefore required to detect failures of the sensors or a failure of a mechanical element that moves according to the rotary motion of the steering motor, etc.

SUMMARY OF THE INVENTION

It is one object of the invention to provide a vehicle steering device that detects a failure of a sensor or a mechanical element that moves according to rotary motion of a steering motor, etc. by simple processing, a failure determination method for the vehicle steering device, etc.

A vehicle steering device according to one aspect of the invention includes: a steering mechanism that steers a steered wheel of a vehicle by driving of a steering motor according to operation of an operation unit; a motor angle sensor that detects a rotation angle of the steering motor as a periodic electrical angle; a steered angle sensor that detects a steered angle of the steered wheel; a storage unit in which correspondence between the electrical angle and the steered angle that are detected is stored in advance; and a failure determination unit that determines whether there is a failure or not by comparing a relation between the detected electrical angle and the detected steered angle with the correspondence between the electrical angle and the steered angle that is stored in the storage unit.

According to this configuration, the failure determination unit determines whether there is a failure or not by comparing the relation between the electrical angle detected by the motor angle sensor and the steered angle detected by the steered angle sensor with the correspondence between the electrical angle and the steered angle that is stored in the storage unit. Therefore, a failure can be easily detected without the need for an additional mechanism.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 11 is a diagram showing an example of a steering operation angle-motor electrical angle map.

DETAILED DESCRIPTION OF EMBODIMENTS

An embodiment of the invention will be described below with reference to the accompanying drawings.

Figure 1:
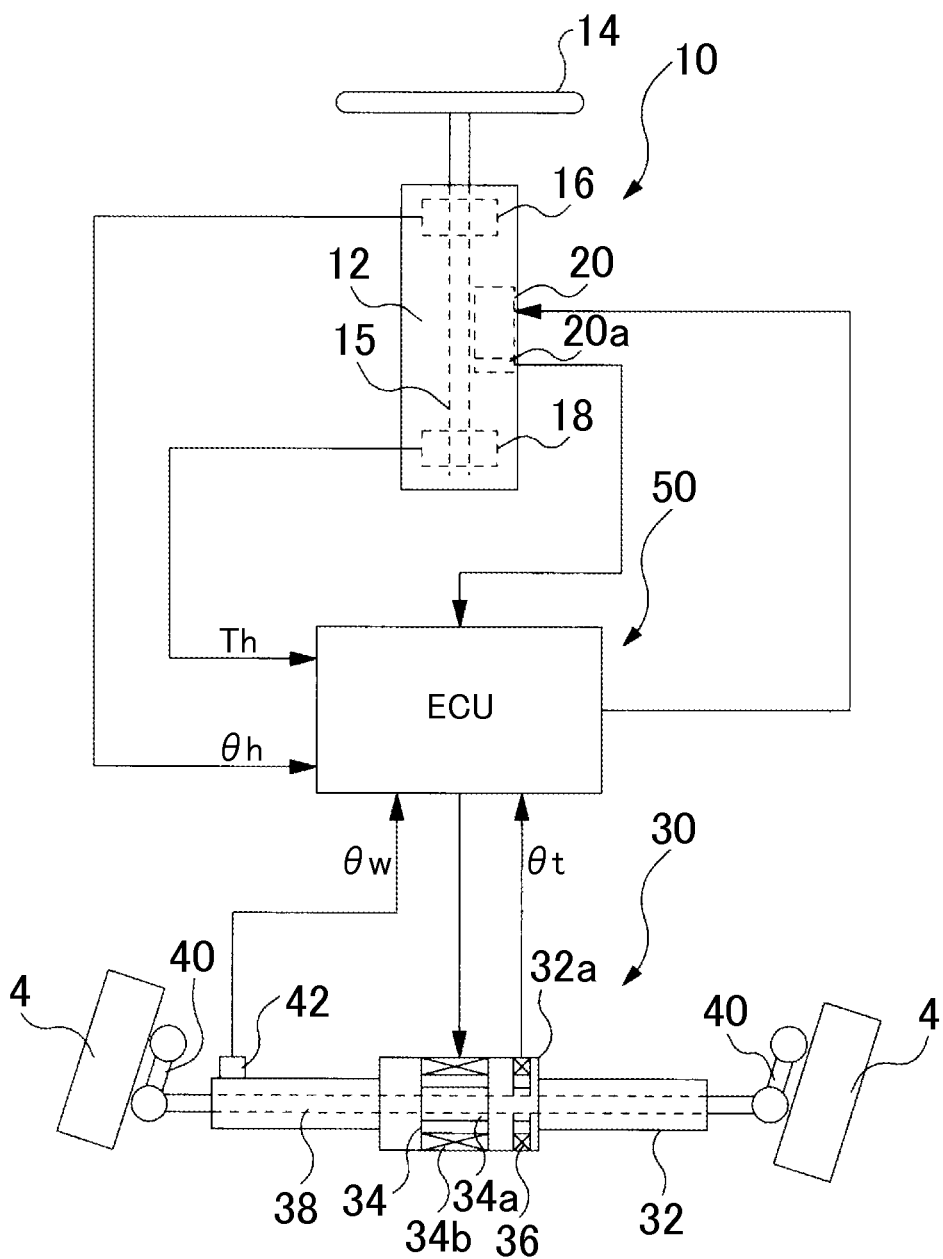
FIG. 1 is a schematic diagram of a vehicle steering device according to an embodiment of the invention.

As shown in FIG. 1, a vehicle steering device 1 mainly includes a steering operation mechanism 10, a steering mechanism 30, and an electronic control unit (ECU) 50. The steering operation mechanism 10 includes a steering wheel 14 serving as an operation unit that is turned by a driver of a vehicle. The steering mechanism 30 includes a steering motor 34 that is drivingly rotated according to the turning operation of the steering wheel 14. The ECU 50 is a controller that drivingly controls the steering motor 34 according to the rotation angle (steering operation angle) of the steering wheel 14.

The steering operation mechanism 10 includes a column 12 provided in a driver's room of the vehicle, the steering wheel 14 that is turned by the driver, a steering operation angle sensor 16 that detects the rotation angle (steering operation angle) of the steering wheel 14, a torque sensor 18 that detects rotation torque applied to the steering wheel 14, and a reaction force motor 20 that applies a force in the opposite direction to the direction of steering operation performed by the driver to the steering wheel 14.

A shaft 15 coupled to a rotation center portion of the steering wheel 14 is accommodated in the column 12. The shaft 15 is a member extending in the axial direction of the column 12, and is rotatably supported by a bearing (not shown) placed in the column 12.

The steering operation angle sensor 16 is provided around the shaft 15 in the column 12, and is electrically connected to the ECU 50. The steering operation angle sensor 16 detects a rotation angle of the shaft 15 that rotates according to the turning operation of the steering wheel 14. For example, the steering operation angle sensor 16 detects a magnetic field of a magnet attached to the outer periphery of the shaft 15 by a Hall sensor, and sequentially outputs the rotation angle of the shaft 15 as a steering operation angle θh to the ECU 50.

In the present specification, the steering operation angle sensor 16 outputs a positive voltage value when the steering wheel 14 is turned to the right based on a neutral position of the steering wheel 14, and outputs a negative voltage value when the steering wheel 14 is turned to the left based on the neutral position of the steering wheel 14. The voltage value that is output from the steering operation angle sensor 16 is gradually increased as the rotation angle to the right increases, and is gradually decreased as the rotation angle to the left increases. The neutral position refers to the position of the steering wheel 14 in the rotation direction in the state where the vehicle is traveling straight, and the same applies to the following description.

Like the steering operation angle sensor 16, the torque sensor 18 is provided around the shaft 15 in the column 12, and detects torque The applied to the steering wheel 14 and the shaft 15 by the turning operation performed by the driver. The torque sensor 18 is electrically connected to the ECU 50, and sequentially outputs the torque Th to the ECU 50.

The reaction force motor 20 is coupled to the shaft 15 via a gear mechanism having a predetermined gear ratio. The reaction force motor 20 is a direct current (DC) motor that is drivingly controlled by the ECU 50. The reaction force motor 20 applies torque to the shaft 15 in the opposite direction to the direction in which the steering wheel 14 is turned by the driver, and this torque serves as a reaction force. A rotation angle of a rotor of the reaction force motor 20 is detected by a rotation angle sensor 20a. The rotation angle sensor 20a is electrically connected to the ECU 50, and sequentially outputs the rotation angle of the rotor of the reaction force motor 20 to the ECU 50.

The steering mechanism 30 includes a cylindrical casing 32, the steering motor 34 that is drivingly controlled by the ECU 50, a motor angle sensor 36 that detects a rotation angle of the steering motor 34, a mechanism that converts rotary motion of a rotor 34a of the steering motor 34 to linear motion in the lateral direction of the vehicle, and a rack 38 serving as a steered shaft that is driven by the conversion mechanism to make linear motion in the lateral direction of the vehicle. The steering mechanism 30 further includes tie rods 40 coupled to both ends of the rack 38, and a steered angle sensor 42 that detects a steered angle θw of steered wheels 4 that are steered according to the linear motion of the rack 38.

The casing 32 is typically immovably attached to the vehicle so as to correspond to the position of the steered wheels 4 that are provided on either the front wheel side or the rear wheel side of the vehicle. The steering motor 34 is a brushless motor that is accommodated in a motor housing 32a provided in the casing 32. The steering motor 34 has the rotor 34a and a stator 34b, and the rotor 34a rotates in forward and reverse directions based on a drive control signal that is output from the ECU 50. The rack 38 extends through the rotor 34a. The rotor 34a and the rack 38 are coupled via a ball screw mechanism, not shown. This ball screw mechanism corresponds to the conversion mechanism, and converts rotary motion of the rotor 34a to linear motion of the rack 38 in the axial direction.

In the steering motor 34, the motor angle sensor 36 is placed coaxially with the rotor 34a. The motor angle sensor 36 is a resolver formed by a rotor that rotates in synchronization with the rotor 34a, and a stator. The rotor of the resolver has the same number of magnetic poles as that of magnetic poles of the steering motor 34. The motor angle sensor 36 is electrically connected to the ECU 50. The motor angle sensor 36 sequentially outputs the rotation angle (mechanical angle) of the rotor 34a of the steering motor 34 to the ECU 50 as a periodic motor electrical angle θt. In the present specification, the motor electrical angle θt of the motor angle sensor 36 at the time the rack 38 is located at the neutral position is 0° for convenience of description.

The rack 38 is a member extending in the axial direction of the casing 32 (the lateral direction of the vehicle). Since the rack 38 is coupled to the rotor 34a via the ball screw mechanism, the rack 38 moves in the lateral direction of the vehicle in the casing 32 according to the rotary motion of the rotor 34a in the forward and reverse directions. The linear motion of the rack 38 in the lateral direction is transmitted to the steered wheels 4 via the tie rods 40 connected to both ends of the rack 38.

The tie rod 40 is a member having its one end connected to the rack 38 and the other end connected to a knuckle, not shown, and pushes and pulls the knuckle according to the linear motion of the rack 38. As the knuckle is pushed and pulled via the tie rod 40, the steered wheel 4 mounted on a wheel attached to the knuckle is synchronously steered in the lateral direction of the vehicle as desired.

The steered angle θw (actual steered angle) of the steered wheels 4 is detected by the steered angle sensor 42. For example, the steered angle sensor 42 is provided at one end of the casing 32. The steered angle sensor 42 detects the steered angle θw of the steered wheels 4 based on the distance to the knuckle that is changed according to steering of the steered wheel 4, or the stroke of the rack 38. The steered angle sensor 42 is electrically connected to the ECU 50 like other sensors, and sequentially outputs the steered angle θw of the steered wheels 4 to the ECU 50.

As described above, the steering mechanism 30 includes the steering motor 34 that makes rotary motion by drive control by the ECU 50. The rotary motion of the steering motor 34 is converted to linear motion of the rack 38, and the linear motion of the rack 38 is transmitted to the knuckles via the tie rods 40, whereby the steered wheels 4 are steered as desired. As shown in the figure, the steering operation mechanism 10 and the steering mechanism 30 are provided independently of each other without using any mechanical element that couples the steering operation mechanism 10 and the steering mechanism 30. In other words, the shaft 15 that rotates according to the rotation operation of the steering wheel 14 is provided independently of the rack 38 and the tie rods 40 that steer the steered wheels 4, without using mechanical coupling therebetween. The operation of the steering operation mechanism 10 and the operation of the steering mechanism 30 are implemented by drive control that is mainly performed by the ECU 50 that executes required processing based on inputs from the various sensors.

Figure 2:
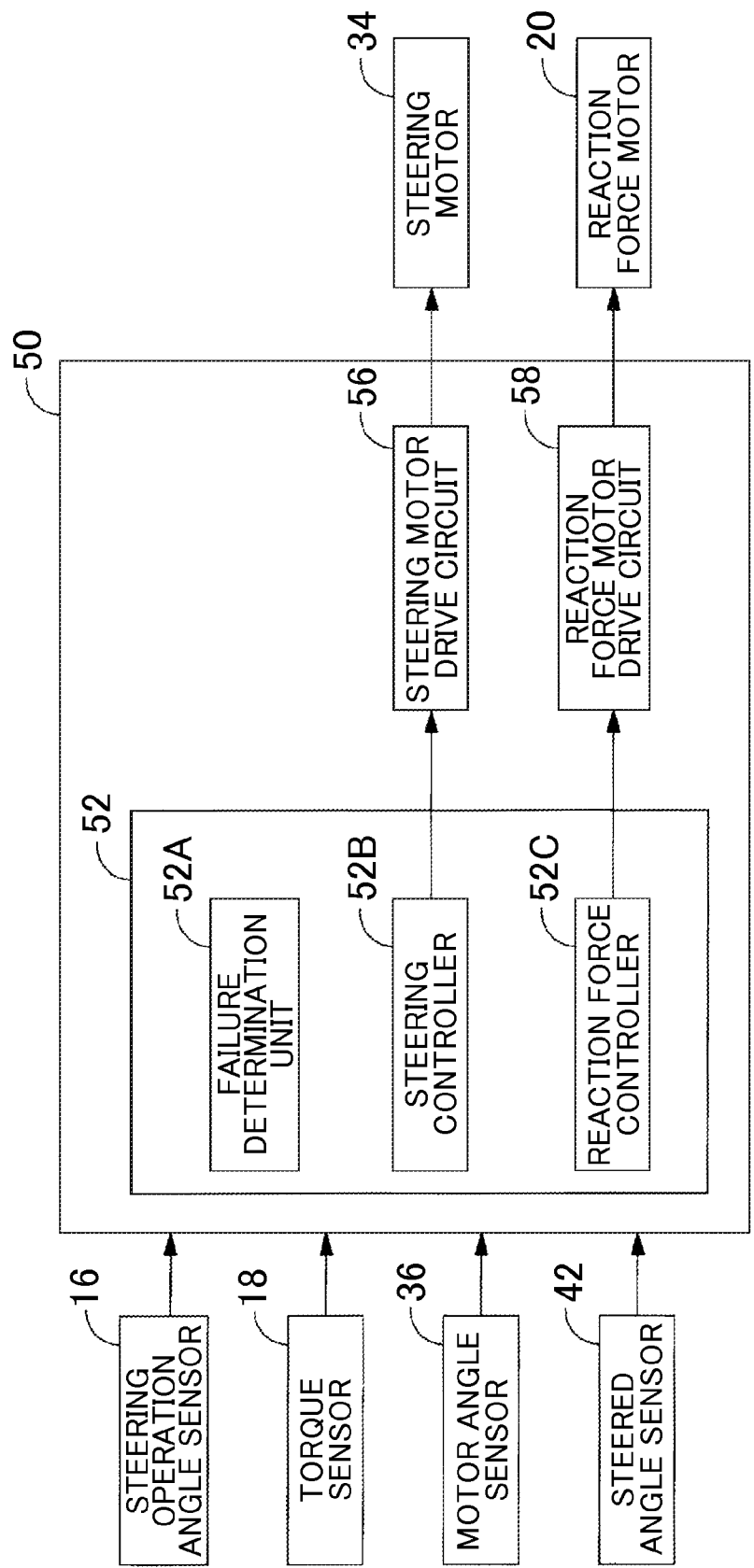
FIG. 2 is a block diagram of an ECU shown in FIG. 1.

FIG. 2 is a block diagram illustrating functions of the ECU 50. The ECU 50 includes a microcomputer 52. The microcomputer 52 includes a central processing unit (CPU) serving as a computation unit, and storage units such as a read only memory (ROM) that stores a basic program required for drive control, a motor electrical angle-steered angle map M1 described below, etc., and a random access memory (RAM) that temporarily stores input values from the various sensors and computation results.

The microcomputer 52 includes a failure determination unit 52A, a steering controller 52B, and a reaction force controller 52C for each function of the microcomputer 52. The failure determination unit 52A detects a failure that occurs in the steering mechanism 30, the steering controller 52B performs drive control of the steering motor 34 of the steering mechanism 30, and the reaction force controller 52C performs drive control of the reaction force motor 20 of the steering operation mechanism 10. For convenience of description, the failure determination unit 52A and the steering controller 52B will first be described in detail, and the reaction force controller 52C will be described later.

The failure determination unit 52A determines whether there is a failure or not by referring to the values of the motor electrical angle $\theta t$ and the steered angle $\theta w$ that are sequentially detected and the motor electrical angle-steered angle map M1. If it is determined that there is no failure, a steering operation mode is not changed from a normal mode. If it is determined that there is a failure, the steering operation mode is switched from the normal mode to a failure mode.

Figure 3:
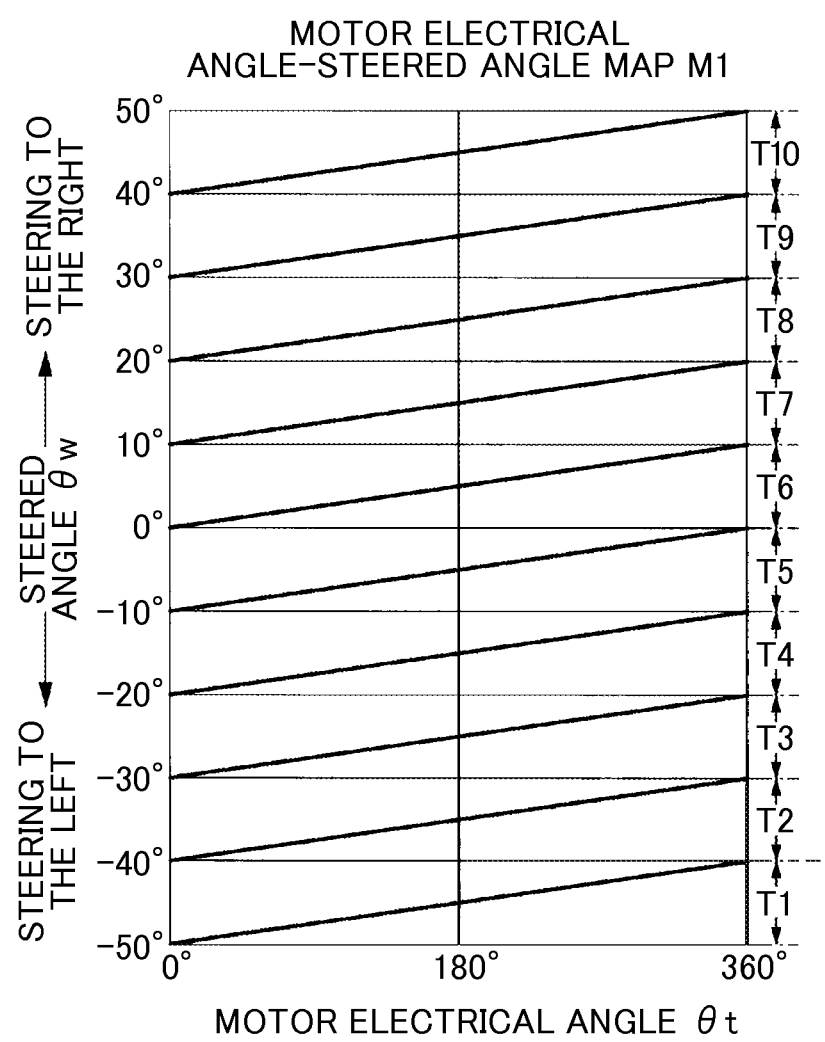
FIG. 3 is a diagram showing an example of a motor electrical angle-steered angle map.

FIG. 3 is a diagram schematically showing the motor electrical angle-steered angle map M1 that is the data stored in advance in a storage region of the ROM. As shown in the figure, correspondence between the motor electrical angle $\theta t$ that is detected by the motor angle sensor 36 according to rotation of the steering motor 34 and the steered angle $\theta w$ that is detected by the steered angle sensor 42 according to steering of the steered wheels 4 is defined as a function in the motor electrical angle-steered angle map M1.

As shown in the figure, in the present embodiment, the motor electrical angles $\theta t$ for, e.g., 10 cycles (360°×10) are repeatedly detected by the motor angle sensor 36 while the steered wheels 4 are being moved from a maximum left steered angle)(−50° to a maximum right steered angle (50°). In the present embodiment, the steered angle)(0° of the steered wheels 4 at the neutral position corresponds to the motor electrical angle (0°), and the same motor electrical angle $\theta t$ is periodically and repeatedly detected every time the steered angle $\theta w$ changes by 10°. A signal relating to the motor electrical angle $\theta t$ from the motor angle sensor 36 is converted to a digital signal by a conversion circuit, not shown. The relation between the steered angle $\theta w$ and the motor electrical angle $\theta t$ is not limited to that shown in FIG. 3.

The steering controller 52B switches computational processing for calculating a target rotation angle $\theta k$ of the steering motor 34 according to whether the current steering operation mode is the normal mode or the failure mode, and drivingly controls the steering motor 34. When the steering operation mode is the normal mode, the steering controller 52B calculates the target rotation angle $\theta k$ of the steering motor 34 based on the steering operation angle $\theta h$ and the steered angle $\theta w$, and drivingly controls the steering motor 34 via a steering motor drive circuit 56.

When the steering operation mode is the failure mode, the steering controller 52B calculates the target rotation angle $\theta k$ of the steering motor 34 according to a faulty part based on the steering operation angle $\theta h$ and an estimated steered angle $\theta z$ that is calculated by the failure determination unit 52A, and drivingly controls the steering motor 34 so as to ensure that the vehicle is steered in the event of a failure. Based on the above description, specific processes that are performed by the failure determination unit 52A and the steering controller 52B and the relation between the processes will be described.

Figure 4:
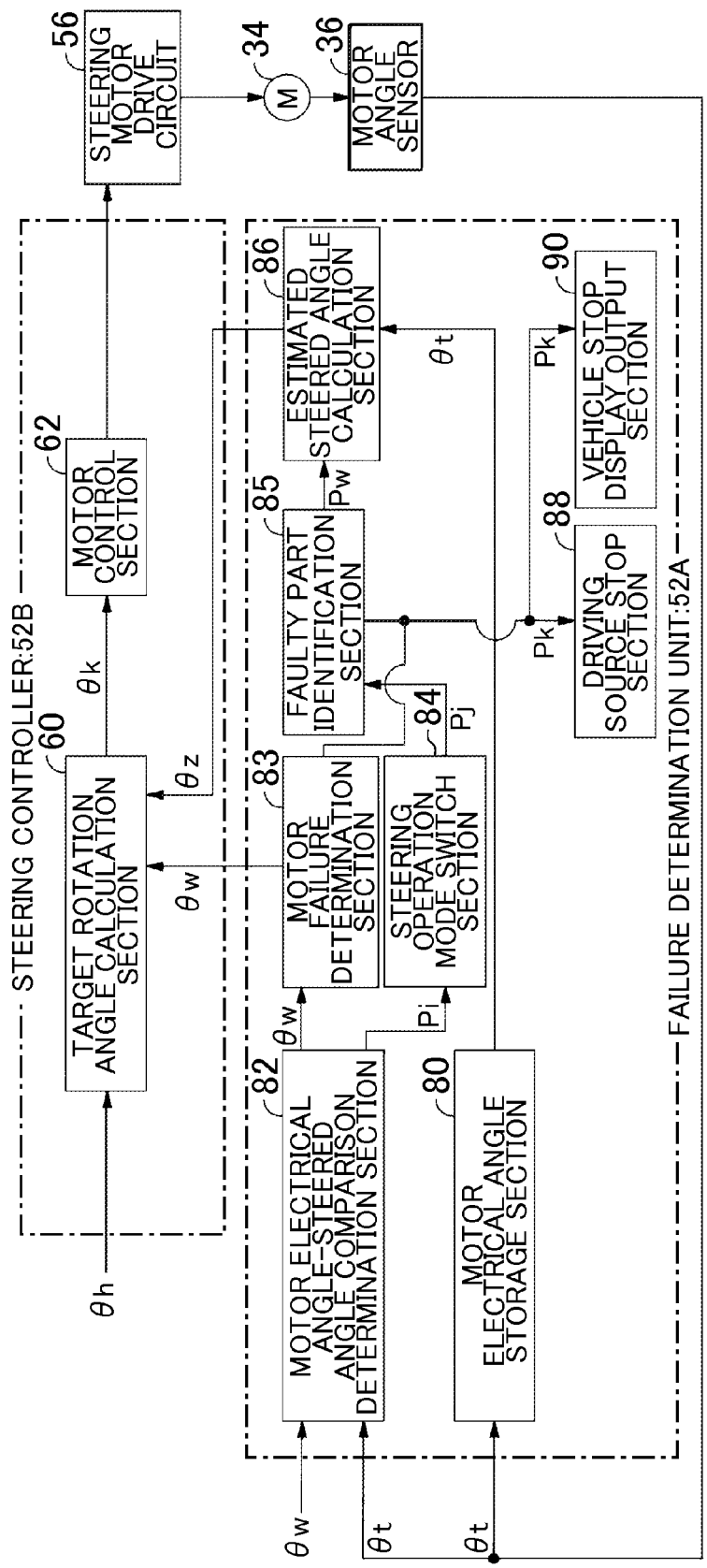
FIG. 4 is a block diagram showing functions of the ECU.
Figure 5:
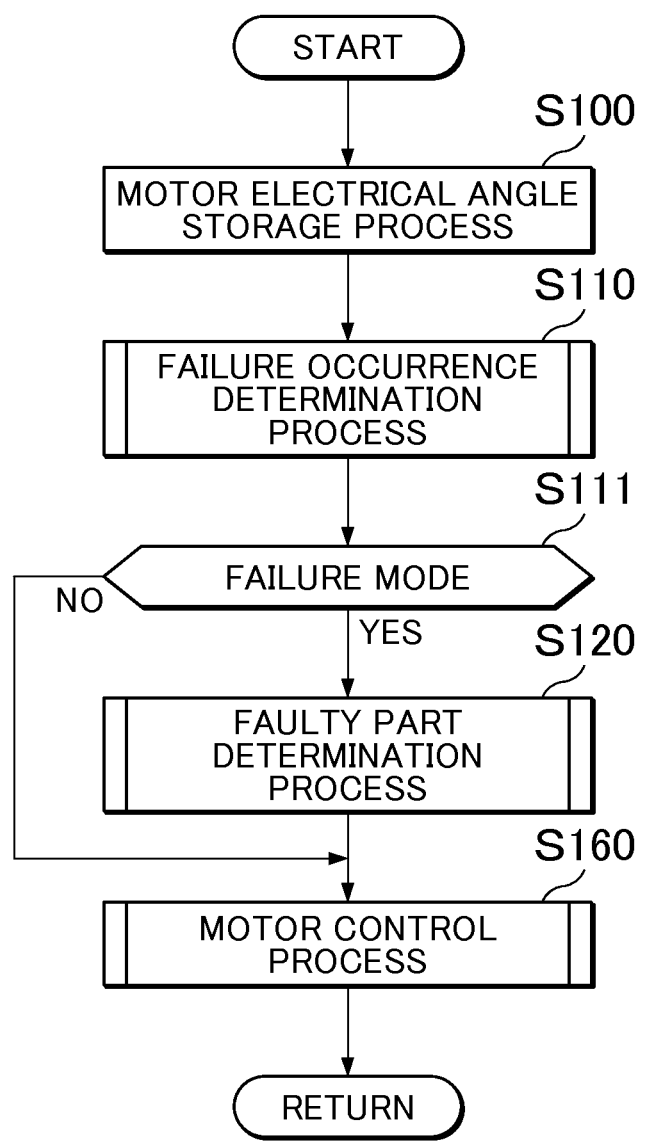
FIG. 5 is a main flowchart showing processing that is performed by the ECU.

FIG. 4 is a block diagram showing each processing function in the configuration of the failure determination unit 52A and the steering controller 52B. FIG. 5 is a main flowchart illustrating processing that is performed by the ECU 50 forming the failure determination unit 52A and the steering controller 52B. As shown in the figure, the ECU 50 repeatedly performs a motor electrical angle storage process (step S100), a failure occurrence determination process (step S110), a steering operation mode determination process (step S111), a faulty part determination process (step S120), and a motor control process (step S160) on the condition that an ignition switch is ON. The failure determination unit 52A and the steering controller 52B will be described below according to the flow of each process.

As shown in FIG. 4, the failure determination unit 52A includes a motor electrical angle storage section 80, a motor electrical angle-steered angle comparison determination section 82, a motor failure determination section 83, a steering operation mode switch section 84, a faulty part identification section 85, an estimated steered angle calculation section 86, a driving source stop section 88, and a vehicle stop display output section 90.

In Step S100 of FIG. 5, the motor electrical angle storage section 80 performs the motor electrical angle storage process, namely a process of sequentially updating and storing in a storage region of the RAM the motor electrical angle $\theta t$ that is sequentially detected by the motor angle sensor 36. As described in detail later, the motor electrical angle $\theta t$ updated and stored by the motor electrical angle storage section 80 is read when the steering operation mode is the failure mode. Although the motor electrical angle $\theta t$ is updated and stored in this example, past values of the motor electrical angle $\theta t$ may be retained for a certain period of time.

Figure 6:
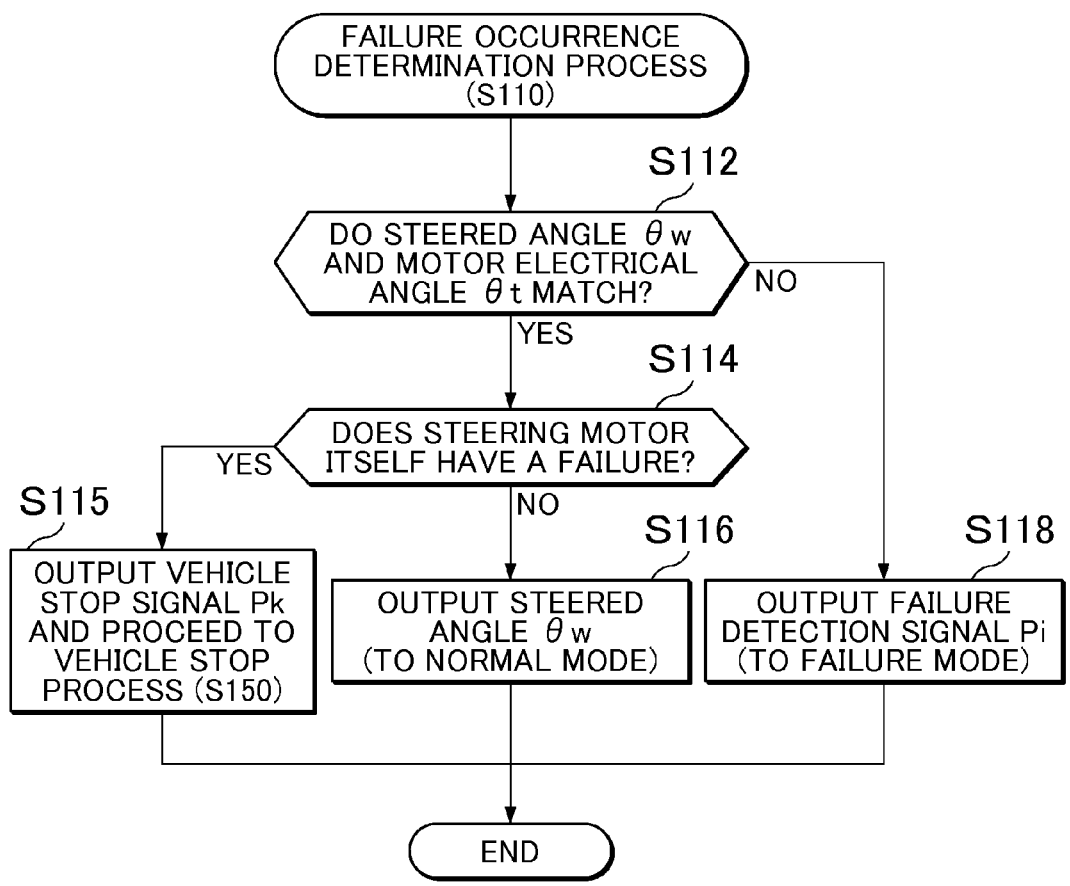
FIG. 6 is a sub-flowchart showing a failure occurrence determination process of the ECU.

FIG. 6 is a sub-flowchart illustrating the failure occurrence determination process (step S110) shown in FIG. 5.

In Step S112 of FIG. 6, the motor electrical angle-steered angle comparison determination section 82 compares the relation between the motor electrical angle $\theta t$ detected by the motor angle sensor 36 and the steered angle $\theta w$ detected by the steered angle sensor 42 with the correspondence between the motor electrical angle $\theta t$ and the steered angle $\theta w$ that is defined in the motor electrical angle-steered angle map M1 shown in FIG. 3, and determines whether there is a failure or not.

Specifically, the motor electrical angle-steered angle comparison determination section 82 compares the relation between the value of the motor electrical angle $\theta t$ and the value of the steered angle $\theta w$ with the correspondence between the value of the motor electrical angle $\theta t$ and the value of the steered angle $\theta w$ that is defined in the motor electrical angle-steered angle map M1, and determines whether the detected motor electrical angle $\theta t$ and the detected steered angle $\theta w$ match the values defined in the motor electrical angle-steered angle map M1 or not. For example, if the motor electrical angle $\theta t$ detected by the motor angle sensor 36 is 360° and the steered angle θw detected by the steered angle sensor 42 is 10°, both values match the values defined in the motor electrical angle-steered angle map M1, and the motor electrical angle-steered angle comparison determination section 82 therefore determines that there is no failure. For example, if the motor electrical angle θt detected by the motor angle sensor 36 is 360° and the steered angle θw detected by the steered angle sensor 42 is 5°, the value of the steered angle θw does not match the value defined in the motor electrical angle-steered angle map M1, and the motor electrical angle-steered angle comparison determination section 82 therefore determines that there is a failure.

If it is determined that the motor electrical angle θt and the steered angle θw match the values defined in the motor electrical angle-steered angle map M1 (if it is determined that there is no failure), the motor electrical angle-steered angle comparison determination section 82 outputs the steered angle θw to the motor failure determination section 83, and the routine proceeds to step S114.

If it is determined that one of the motor electrical angle θt and the steered angle θw does not match the value defined in the motor electrical angle-steered angle map M1 (if it is determined that there is a failure), the routine proceeds to step S118, where the motor electrical angle-steered angle comparison determination section 82 outputs a failure detection signal Pi to the steering operation mode switch section 84, and the process is terminated.

If it is determined in step S112 that there is no failure, the motor failure determination section 83 performs a motor failure determination process, namely a process of determining whether the steering motor 34 itself has a failure (step S114). This process is performed because the possibility that the steering motor 34 itself may have a failure remains even if the motor electrical angle θt and the steered angle θw match the values defined in the motor electrical angle-steered angle map M1. It is herein assumed that the steering motor 34 itself has a failure if the steering motor 34 does not make rotary motion corresponding to a drive control signal that is output from a motor control section 62.

The motor failure determination section 83 compares the steered angle θw received from the motor electrical angle-steered angle comparison determination section 82 with the previous target rotation angle θk calculated and stored in the motor control process (step S160) described later. If the steered angle θw does not correspond to the target rotation angle θk, the motor failure determination section 83 determines that the steering motor 34 itself has a failure, and the routine proceeds to step S115. If the steered angle θw corresponds to the target rotation angle θk, the motor failure determination section 83 determines that the steering motor 34 itself has no failure, and the routine proceeds to step S116.

As described above, the motor failure determination process is performed if the motor electrical angle θt and the steered angle θw match the values defined in the motor electrical angle-steered angle map M1, that is, if the motor angle sensor 36 and the steered angle sensor 42 do not have a failure. Accordingly, a failure of the steering motor 34 itself can be easily detected.

If it is determined in step S114 that the steering motor 34 itself has a failure, the motor failure determination section 83 outputs a vehicle stop signal Pk to the driving source stop section 88 and the vehicle stop display output section 90 (step S115), and the process is terminated. The driving source stop section 88 and the vehicle stop display output section 90 will be described later.

If it is determined in step S114 that the steering motor 34 itself has no failure, the motor failure determination section 83 outputs the steered angle θw to a target rotation angle calculation section 60 of the steering controller 52B (step S116).

The failure determination unit 52A that performs step S112 compares the relation between the motor electrical angle θt detected by the motor angle sensor 36 and the steered angle θw detected by the steered angle sensor 42 with the correspondence defined in the motor electrical angle-steered angle map M1, and determines whether there is a failure or not based on whether the motor electrical angle θt and the steered angle θw match the values defined in the motor electrical angle-steered angle map M1. Accordingly, a failure can be easily detected without the need for an additional mechanism.

The steering operation mode switch section 84 switches the steering operation mode from the normal mode to the failure mode in response to the failure detection signal Pi received from the motor electrical angle-steered angle comparison determination section 82. Specifically, the steering operation mode switch section 84 outputs a faulty part determination start signal Pj to the faulty part identification section 85. If the steering operation mode is switched to the failure mode, it is determined YES in the steering operation mode determination process (step S111). Thereafter, the faulty part determination process (step S120) in the failure mode is performed in response to the faulty part determination start signal Pj that is output based on the determination result of the motor electrical angle-steered angle comparison determination section 82, as described below. If the steering operation mode is the normal mode, it is determined NO in the steering operation mode determination process, and the routine proceeds to the motor control process (step S160) described below.

Figure 7:
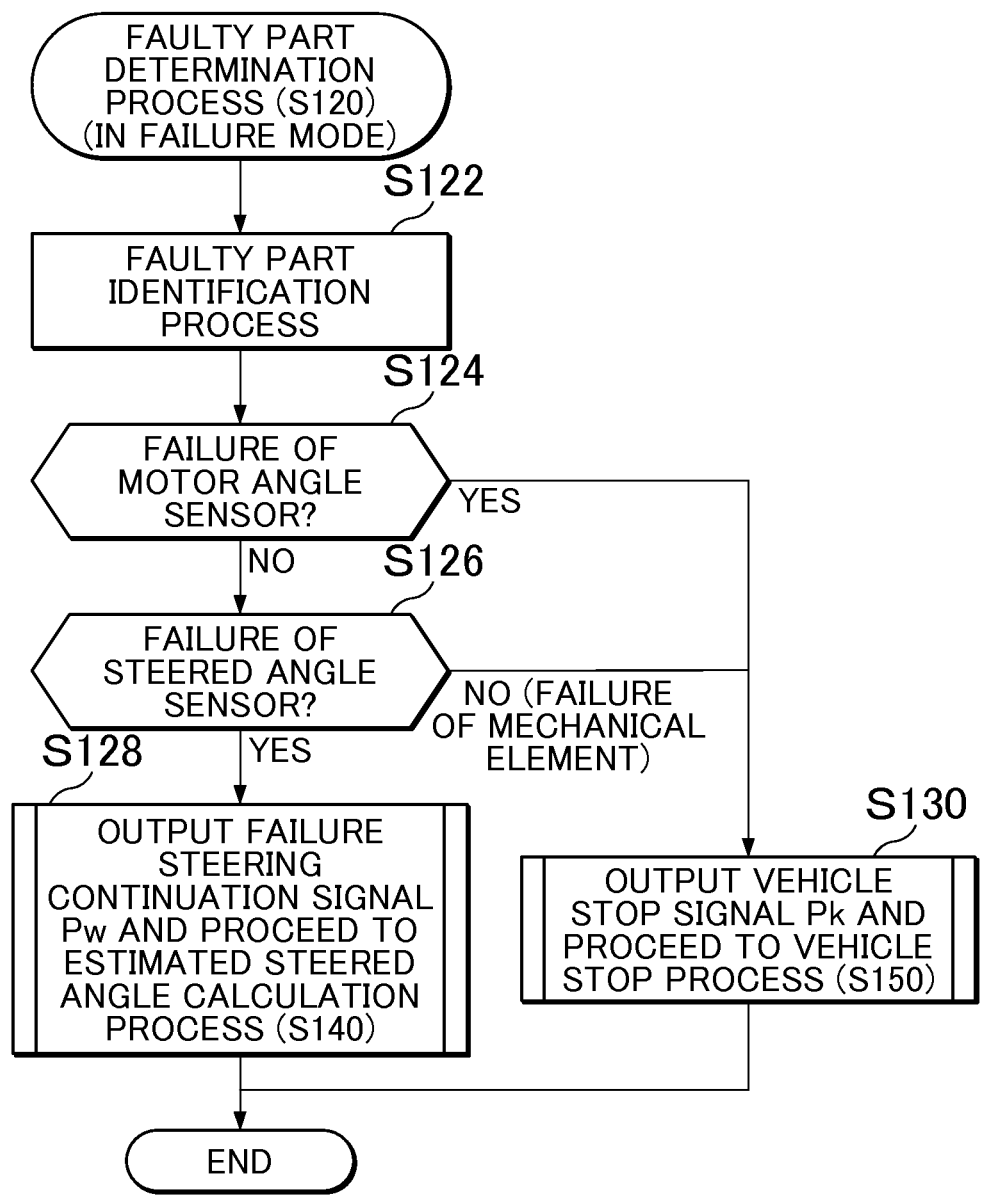
FIG. 7 is a sub-flowchart showing a faulty part determination process of the ECU.

FIG. 7 is a sub-flowchart illustrating the faulty part determination process (step S120) shown in FIG. 5. In the faulty part determination process, the condition of the failure detected by the failure occurrence determination process is analyzed to identify a fault part and to determine whether the vehicle should be allowed to travel or not according to the identified faulty part.

In response to the faulty part determination start signal Pj received from the steering operation mode switch section 84, the faulty part identification section 85 outputs a failure steering continuation signal Pw to the estimated steered angle calculation section 86 to perform a faulty part identification process (step S122 in FIG. 7). As described in detail later, the estimated steered angle calculation section 86 calculates the estimated steered angle θz based on the motor electrical angle θt that is read from the motor electrical angle storage section 80. The estimated steered angle θz thus calculated is output to the target rotation angle calculation section 60 described below. The target rotation angle calculation section 60 calculates the target rotation angle θk based on the steering operation angle θh and the estimated steered angle θz, and the motor control section 62 controls the steering motor 34 based on the target rotation angle θk. The faulty part identification section 85 identifies a faulty part as described below by outputting the failure steering continuation signal Pw to temporarily drive the steering motor 34.

First, the faulty part identification section 85 determines whether the faulty part is the motor angle sensor 36 or not. It is herein assumed that the motor angle sensor 36 has a failure in the case where the motor electrical angle θt does not correspond to the rotation angle of the steering motor 34.

The faulty part identification section 85 reads the motor electrical angle θt of the steering motor 34 that is stored after the output of the failure steering continuation signal Pw, and determines whether the amount of change in motor electrical angle θt before and after the motor electrical angle θt is read corresponds to the target rotation angle θk or not.

If it is determined that the amount of change in motor electrical angle θt corresponds to the target rotation angle θk, the motor angle sensor 36 is identified as not being the faulty part. If it is determined that the amount of change in motor electrical angle θt does not correspond to the target rotation angle θk, the motor angle sensor 36 is identified as the faulty part. If the motor angle sensor 36 is identified as not being the faulty part, it is determined that the faulty part is the steered angle sensor 42 or a mechanical element that moves according to the rotary motion of the steering motor 34.

Next, the faulty part identification section 85 determines whether the faulty part is the steered angle sensor 42 or not. It is herein assumed that the steered angle sensor 42 has a failure in the case where the output steered angle θw does not correspond to the actual steered angle of the steered wheels 4.

The faulty part identification section 85 determines whether the tendency of change in motor electrical angle θt that is output from the steering motor 34 after the output of the failure steering continuation signal Pw corresponds to the tendency of change in steered angle θw that is output from the steered angle sensor 42 according to the steering motion. The expression "tendency of change in motor electrical angle θt corresponds to the tendency of change in steered angle θw" herein means that the motor electrical angle θt and the steered angle θw change in the same direction, such as the case where both a change in motor electrical angle θt and a change in steered angle θw represent steering to the right.

If it is determined that the tendency of change in motor electrical angle θt corresponds to the tendency of change in steered angle θw, the steered angle sensor 42 is identified as not being the faulty part, and at the same time, it is determined that the faulty part is the mechanical element that moves according to the rotary motion of the steering motor 34. If it is determined that the tendency of change in motor electrical angle θt does not correspond to the tendency of change in steered angle θw, the steered angle sensor 42 is identified as the faulty part.

If the series of processes for the motor angle sensor 36 and the steered angle sensor 42 are performed, and the motor angle sensor 36 and the steered angle sensor 42 are identified as not being the faulty part, it is determined that the faulty part is the mechanical element that moves according to the rotary motion of the steering motor 34.

The faulty part identification section 85 determines whether the faulty part identified in step S122 is the motor angle sensor 36 or not (step S124 in FIG. 7). If it is determined that the faulty part is not the motor angle sensor 36, the routine proceeds to step S126. If it is determined that the faulty part is the motor angle sensor 36, the routine proceeds to step S130.

The faulty part identification section 85 determines whether the faulty part identified in step S122 is the steered angle sensor 42 or not (step S126 in FIG. 7). If it is determined that the faulty part is the steered angle sensor 42, the routine proceeds to step S128. If it is determined that the faulty part is not the steered angle sensor 42, that is, if the faulty part is the mechanical element that moves according to the rotary motion of the steering motor 34, the routine proceeds to step S130 as in the case where the faulty part is the motor angle sensor 36.

If the faulty part identified in step S122 is the steered angle sensor 42, the faulty part identification section 85 subsequently continuously outputs the failure steering continuation signal Pw to the estimated steered angle calculation section 86 (step S128 in FIG. 7), and the process is terminated. The estimated steered angle calculation section 86 performs an estimated steered angle calculation process (step S140) in response to the failure steering continuation signal Pw.

If the faulty part identified in step S122 is the motor angle sensor 36 or the mechanical element that moves according to the rotary motion of the steering motor 34, the faulty part identification section 85 outputs the vehicle stop signal Pk to the driving source stop section 88 and the vehicle stop display output section 90 (step S130 in FIG. 7), and the process is terminated. The driving source stop section 88 and the vehicle stop display output section 90 performs a vehicle stop process (step S150) in response to the vehicle stop signal Pk.

Figure 8:
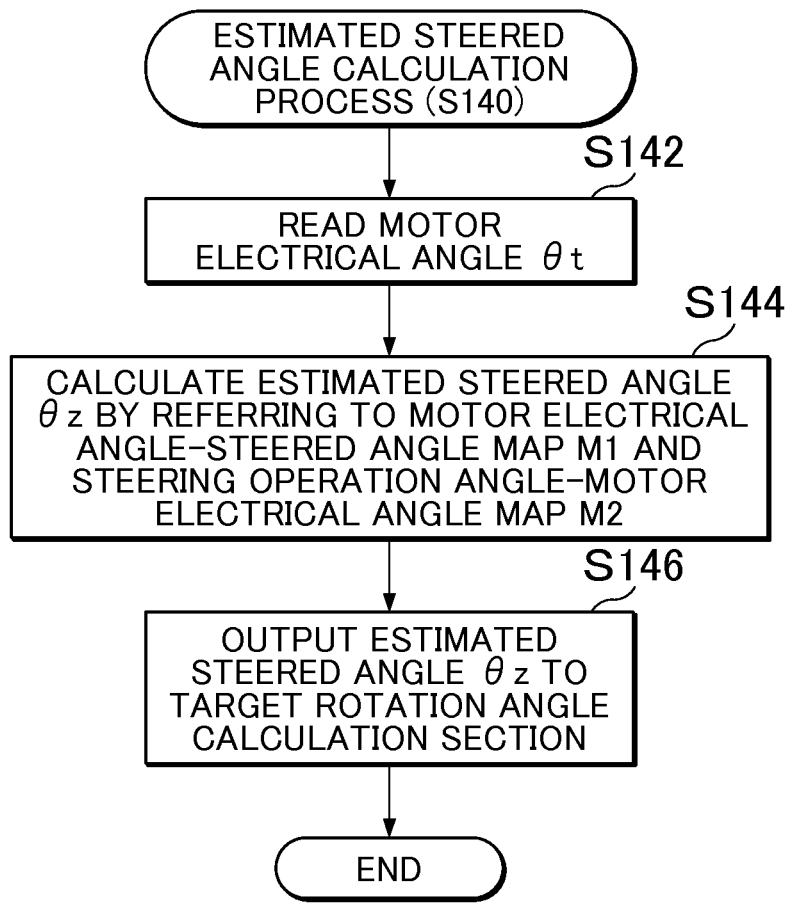
FIG. 8 is a sub-flowchart showing an estimated steered angle calculation process of the ECU.

FIG. 8 is a sub-flowchart illustrating the estimated steered angle calculation process (step S140) shown in FIG. 7. The estimated steered angle calculation process is performed in the case where the faulty part identification process (step S122) is performed or in the case where the steered angle sensor 42 has been identified as the faulty part (step S128) by the faulty part identification process.

The estimated steered angle calculation section 86 reads the motor electrical angle θt stored by the motor electrical angle storage section 80 in response to the failure steering continuation signal Pw (step S142). The failure steering continuation signal Pw is input to the estimated steered angle calculation section 86 in the faulty part identification process (step S122) and in the case where the steered angle sensor 42 has been identified as the faulty part (step S128).

The estimated steered angle calculation section 86 calculates the estimated steered angle θz based on the motor electrical angle θt read in step S142 and the steering operation angle θh detected by the steering operation angle sensor 16 (step S144). The estimated steered angle θz is information on the steered angle (actual steered angle) of the steered wheels 4 that is used instead of the steered angle θw that is detected by the steered angle sensor 42 in the normal mode.

FIG. 11 is a diagram showing an example of a steering operation angle-motor electrical angle map M2 in which correspondence between the steering operation angle θh and the motor electrical angle θt is defined as a function. The estimated steered angle θz is calculated by referring to the motor electrical angle-steered angle map M1 shown in FIG. 3 and the steering operation angle-motor electrical angle map M2 shown in FIG. 11. That is, since a plurality of steered angles θw correspond to the same motor electrical angle θw (e.g., θw=−40°, −30°, −20°, . . . for θt=360°) as shown in the motor electrical angle-steered angle map M1, the estimated steered angle θz cannot be directly calculated from the obtained motor electrical angle θt.

The estimated steered angle θz is therefore calculated by referring to the steering operation angle-motor electrical angle map M2 as well. Specifically, the estimated steered angle calculation section 86 first refers to the steering operation angle-motor electrical angle map M2 to specify a cycle Tn of the motor electrical angle θt corresponding to the steering operation angle θh. Next, the estimated steered angle calculation section 86 refers to the motor electrical angle-steered angle map M1 to calculate as the estimated steered angle θz the steered angle corresponding to the motor electrical angle θt in the specified cycle Tn.

The estimated steered angle calculation section 86 outputs the estimated steered angle θz calculated in step S144 to the target rotation angle calculation section 60 of the steering controller 52B (step S146), and the process is terminated.

As described above, in the estimated steered angle calculation process, the estimated steered angle θz that is used instead of the steered angle θw is calculated based on the motor electrical angle θt stored in the motor electrical angle storage section 80 and the steering operation angle θh, in the case where a failure (a failure other than the failure of the steering motor 34 itself) is detected by the failure occurrence determination process (step S110) and the faulty part is identified by the faulty part identification process (step S122) or in the case where the steered angle sensor 42 has been identified as the faulty part by the faulty part identification process.

By performing such a process, the faulty part can be identified. Moreover, even if the faulty part is the steered angle sensor 42, and the failure of the steered angle sensor 42 is such a failure that affects reliability of the steered angle θw that is detected by the steered angle sensor 42, the steering controller 52B described below can continue drive control of the steering motor 34 based on the estimated steered angle θz that is used instead of the steered angle θw. This can ensure that the vehicle is steered even after a failure occurs in the steered angle sensor 42.

Figure 9:
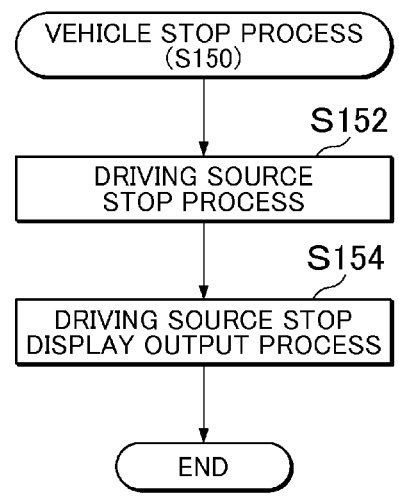
FIG. 9 is a sub-flowchart showing a vehicle stop process of the ECU.

FIG. 9 is a flowchart illustrating the vehicle stop process (step S150). The vehicle stop process is performed in the case where the faulty part is the steering motor 34 itself, in the case where the faulty part is the motor angle sensor 36, or in the case where the faulty part is the mechanical element that moves according to the rotary motion of the steering motor 34.

The driving source stop section 88 performs a driving source stop process, namely a process of stopping a driving source such as a motor or an engine that is connected to driving wheels of the vehicle, based on the vehicle stop signal Pk received from the motor failure determination section 83 or the faulty part identification section 85 (step S152). The driving source such as the motor or the engine does not appear in the figure.

The vehicle stop display output section 90 performs a driving source stop display output process, namely a process of notifying the driver of the fact that the driving source is stopped or the fact that the vehicle should be stopped, by a notification unit such as a display unit or a lamp that is provided around the driver's seat of the vehicle, based on the vehicle stop signal Pk received from the motor failure determination section 83 or the faulty part identification section 85 (step S154). The notification unit such as the display unit or the lamp does not appear in the figure. Since the vehicle stop process is performed by the driving source stop section 88 and the vehicle stop display output section 90, the vehicle having a failure in the steering motor 34 itself, the motor angle sensor 36, or the mechanical element that moves according to the rotary motion of the steering motor 34 can be immediately stopped.

Figure 10:
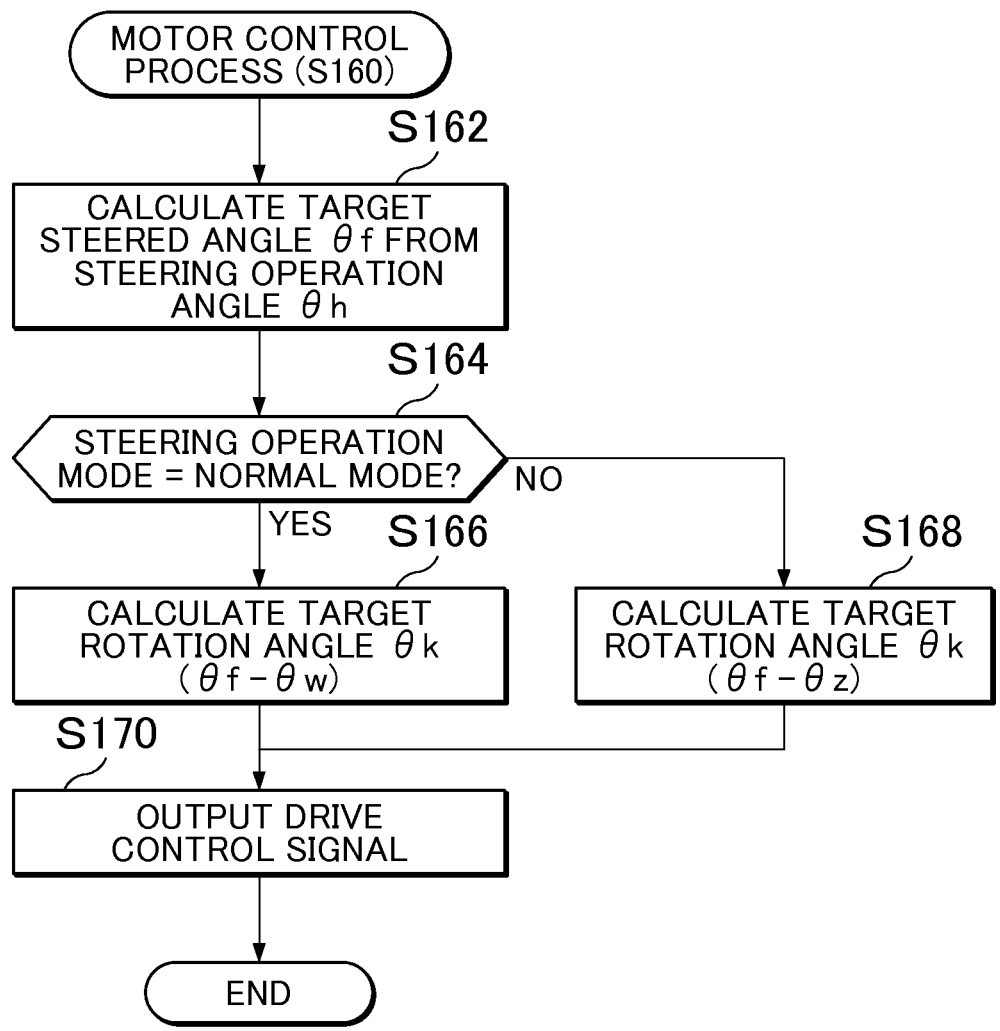
FIG. 10 is a sub-flowchart showing a motor control process of the ECU.

As shown in FIG. 4, the steering controller 52B has the target rotation angle calculation section 60 and the motor control section 62. FIG. 10 is a flowchart illustrating the motor control process (step S160) that is performed by the ECU 50 forming the steering controller 52B.

The target rotation angle calculation section 60 calculates a target steered angle θf according to the steering operation angle θh that is detected by the steering operation angle sensor 16 (step S162). The target steered angle θf is calculated based on a map in which correspondence between the steering operation angle θh and the target steered angle θf is defined in advance, or a predetermined function.

For example, in the case of calculating the target steered angle θf by using a map, a map for calculating a predetermined target steered angle θf according to the resolution of the steering operation angle sensor 16 is stored in advance. The target steered angle θf corresponding to the steering operation angle θh can be calculated by referring to this map.

In the case of calculating the target steered angle θf by using a function, the target steered angle θf is calculated by using a linear or non-linear function with which the target steered angle θf can be calculated according to the magnitude of the steering operation angle θh.

In order to change a steering operation ratio so that the target steered angle θf for the steering operation angle θh changes according to the vehicle traveling speed, a plurality of maps according to traveling speeds are stored in advance, and the target steered angle θf is calculated by reading the map corresponding to the traveling speed. For example, in order to change the steering operation ratio in the case of calculating the target steered angle θf by using a function, a plurality of linear or non-linear functions with which different target steered angles Of can be calculated for the same steering operation angle θh according to the traveling speed are stored in advance, and the target steered angle θf is calculated by reading the function corresponding to the traveling speed.

The target rotation angle calculation section 60 determines whether the current steering operation mode is the normal mode or not (step S164). If it is determined that the current steering operation mode is the normal mode, the routine proceeds to step S166. If it is determined that the current steering operation mode is the failure mode, the routine proceeds to step S168.

If the current steering operation mode is the normal mode, the target rotation angle calculation section 60 calculates the target rotation angle θk based on the difference between the target steered angle θf calculated in step S162 and the steered angle θw detected by the steered angle sensor 42. The target rotation angle calculation section 60 outputs the calculated target rotation angle θk to the motor control section 62.

If the current steering operation mode is the failure mode, the target rotation angle calculation section 60 calculates the target rotation angle θk based on the difference between the target steered angle θf calculated in step S162 and the estimated steered angle θz received from the estimated steered angle calculation section 86 (step S168). The target rotation angle calculation section 60 outputs the calculated target rotation angle θk to the motor control section 62.

The motor control section 62 controls the steering motor 34 by, e.g., pulse width modulation (PWM) control (step S170). The motor control section 62 outputs a drive control signal to the steering motor drive circuit 56 so that the rotation angle corresponding to the target rotation angle θk calculated in step S166 or step S168 and the torque that steers the steered wheels 4 are obtained, and the process is completed. The steering motor drive circuit 56 is controlled to rotationally drive the steering motor 34 according to the drive control signal received from the motor control section 62.

As described above, in the motor control process, the target rotation angle θk is calculated by the different processes according to whether the steering operation mode is the normal mode or the failure mode. Particularly in the case where the steering operation mode is the failure mode (in the case where the faulty part is the steered angle sensor 42), the target rotation angle θk is calculated based on the estimated steered angle θz calculated instead of the steered angle θw by the estimated steered angle calculation process (step S140). This can ensure that the vehicle is steered by driving of the steering motor 34 even after a failure occurs in the steered angle sensor 42.

The reaction force controller 52C will be described briefly. The reaction force controller 52C drivingly controls the reaction force motor 20 so that the torque in the opposite direction to the direction in which the steering wheel 14 is turned by the driver is produced, based on the steering operation angle θh that is detected by the steering operation angle sensor 16 and the torque Th that is detected by the torque sensor 18. A drive control signal from the reaction force controller 52C is output to the reaction force motor drive circuit 58. The reaction force motor drive circuit 58 outputs a predetermined current to the reaction force motor 20 according to the drive control signal received from the reaction force controller 52C to rotationally drive the reaction force motor 20. The drive control of the reaction force motor 20 by the reaction force controller 52C allows the driver to steer the vehicle while feeling a force in the opposite direction to the direction in which the steering wheel 14 is turned when he/she turns the steering wheel 14. The reaction force motor 20 and the reaction force controller 52C may be omitted depending on the characteristics of the vehicle. Together with or instead of the reaction force motor 20 and the reaction force controller 52C, a torsion spring, not shown, may be provided at the end of the shaft 15 to apply a reaction force according to the turning operation of the steering wheel 14.

In the present embodiment, the resolver that has high durability due to its structural characteristics and that outputs the rotation angle of the steering motor 34 as a periodic electrical angle is used as the motor angle sensor 36. This improves reliability of the motor electrical angle θt corresponding to the rotation angle of the steering motor 34. Accordingly, a failure that affects reliability of the steered angle θw that is detected by the steered angle sensor 42, etc. can be easily detected.

In the present embodiment, the process (step S112) that is performed by the motor electrical angle-steered angle comparison determination section 82 is sequentially performed every time it receives the motor electrical angle θt and the steered angle θw. However, the invention is not limited to this. For example, the motor electrical angle-steered angle comparison determination section 82 may determine the relation between the steered angle θw and the motor electrical angle θt only when the steered angle θw has a value (0°) corresponding to the neutral position.

Specifically, a process of determining whether the steered angle θw is the angle corresponding to the neutral position or not is provided in a stage preceding step S112 so that the process that proceeds to step S112 is performed only when the steered angle θw corresponds to the neutral position. This configuration can reduce the number of times step S112 is performed, and can reduce processing load on the ECU 50.

Since the determination process is performed in response to the steered angle θw corresponding to the neutral position that is most frequently used during traveling of the vehicle, sufficient accuracy required for failure detection can be ensured as compared to the case where the determination process is performed in response to the steered angles θw corresponding to other positions.

In the process (step S112) that is performed by the motor electrical angle-steered angle comparison determination section 82, whether there is a failure or not is determined based on whether the motor electrical angle θt and the steered angle θw match the values defined in the motor electrical angle-steered angle map M1. However, a predetermined threshold may be set. Specifically, if the difference between the detected value and the value defined in the map is equal to or less than the threshold, these values may be regarded as matching each other, and it may be determined that there is no failure.

The present embodiment is described with respect to the case where the motor electrical angle θt from the motor angle sensor 36 is 0° when the rack 38 is located at the neutral position. However, the invention is not limited to this. The motor electrical angle θt may have a phase difference for the neutral position of the rack 38. In this case, the ECU 50 performs a process of correcting the phase difference to 0°, etc.

In the present embodiment, the routine proceeds to the vehicle stop process (step S150) if the faulty part is the motor angle sensor 36. However, the motor control process (step S160) may be performed without performing the vehicle stop process, and the target rotation angle θk may be calculated by a process similar to that (step S166) in the case where the steering operation mode is the normal mode, thereby ensuring that the vehicle is steered. In this case, it is desirable to notify the driver of the fact that the vehicle should be stopped.

In the case where there is no input signal (motor electrical angle θt) from the motor angle sensor 36 in the motor electrical angle storage process (step S100) of the present embodiment, there is a possibility of disconnection in the motor angle sensor 36. Accordingly, the routine may immediately proceed to the vehicle stop process (step S150) without performing the failure occurrence determination process (step S110) and the faulty part determination process (step S120). Alternatively, as in the case described above, the motor control process (step S160) may be immediately performed, and the target rotation angle θk may be calculated by a process similar to that in the case where the steering operation mode is the normal mode, thereby ensuring that the vehicle is steered. In this case as well, it is desirable to notify the driver of the fact that the vehicle should be stopped.

In the case where there is no input signal (θw) from the steered angle sensor 42 in the failure occurrence determination process (step S110) of the present embodiment, there is a possibility of disconnection in the steered angle sensor 42. Accordingly, the estimated steered angle calculation process (step S140) may be immediately performed without performing the faulty part determination process (step S120), and the steering motor 34 may be controlled based on the estimated steered angle θz (step S168), thereby ensuring that the vehicle is steered.

If it is determined in the faulty part identification process (step S122) of the present embodiment that the faulty part is the steered angle sensor 42 or the mechanical element that moves according to the rotary motion of the steering motor 34, but the steered angle θw does not change before and after the output of the failure steering continuation signal Pw, it cannot be determined which of the steered angle sensor 42 and the mechanical element that moves according to the rotary motion of the steering motor 34 is the faulty part.

Accordingly, in this case, the routine may immediately proceed to the vehicle stop process (step S150).

The above embodiment is described with reference to the example of the vehicle having the steered wheels 4 located in the front part. However, the vehicle steering device 1 may be similarly applicable to vehicles having the steered wheels 4 located in the rear part, such as a forklift truck. In this case, the relation between the direction in which the steering wheel 14 is turned and the steering direction of the steered wheels 4 is opposite to that described above.

What is claimed is:

1. A vehicle steering device comprising:
    a steer-by-wire steering mechanism that steers a steered wheel of a vehicle by driving of a steered motor according to a signal generated from a steering motor according to operation of an operation unit;
    a motor angle sensor that detects a rotation angle of the steering motor as a periodic electrical angle;
    a steered angle sensor that detects a steered angle of the steered wheel that is steered by the driving of the steering motor;
    a storage unit in which correspondence between the electrical angle and the steered angle that are detected is stored in advance; and
    a failure determination unit that determines whether there is a failure or not of the steer-by-wire mechanism by comparing a relation between the detected electrical angle and the detected steered angle with the correspondence between the electrical angle and the steered angle that is stored in the storage unit.

2. The vehicle steering device according to claim 1, further comprising:
    a steering operation angle sensor that detects a steering operation angle of the operation unit;
    a sequential storage section that sequentially stores the detected electrical angle;
    an estimated steered angle calculation section that calculates an estimated steered angle of the steered wheel based on the electrical angle stored in the sequential storage section and the detected steering operation angle if it is determined by the failure determination unit that there is a failure; and
    a steering controller that controls the driving of the steering motor based on the steering operation angle and the calculated estimated steered angle.

3. The vehicle steering device according to claim 1, wherein
    the determination of the failure determination unit is performed when the steered angle corresponds to a neutral position of the steered wheel.

4. The vehicle steering device according to claim 1, wherein
    the motor angle sensor is a resolver.

5. A failure determination method for a vehicle steering device including
    a steer-by-wire steering mechanism that steers a steered wheel of a vehicle by driving of a steered motor according to a signal generated from a steering motor according to operation of an operation unit,
    a motor angle sensor that detects a rotation angle of the steering motor as a periodic electrical angle,
    a steered angle sensor that detects a steered angle of the steered wheel that is steered by the driving of the steering motor, and
    a storage unit in which correspondence between the electrical angle and the steered angle that are detected is stored in advance, comprising:
    determining whether there is a failure or not of the steer-by-wire mechanism by comparing a relation between the detected electrical angle and the detected steered angle with the correspondence between the electrical angle and the steered angle that is stored in the storage unit.

6. A control method for the steering motor in the vehicle steering device using the failure determination method according to claim 5, the vehicle steering device further including
    a steering operation angle sensor that detects a steering operation angle of the operation unit,
    a sequential storage section that sequentially stores the detected electrical angle, and
    a steering controller that controls the driving of the steering motor, the control method comprising:
    reading the electrical angle stored in the sequential storage section, if it is determined that there is a failure; and
    calculating an estimated steered angle of the steered wheel based on the read electrical angle and the detected steering operation angle, wherein
    the steering controller controls the driving of the steering motor based on the steering operation angle and the estimated steered angle.

* * * * *